United States Patent
Karlsson et al.

(10) Patent No.: US 8,612,028 B2
(45) Date of Patent: Dec. 17, 2013

(54) SYSTEM AND METHOD FOR DETERMINING CORRECT SIGN OF RESPONSE OF AN ADAPTIVE CONTROLLER

(75) Inventors: Magnus Karlsson, Mountain View, CA (US); Michele M. Covell, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2074 days.

(21) Appl. No.: 11/149,991

(22) Filed: Jun. 10, 2005

(65) Prior Publication Data
US 2006/0287737 A1    Dec. 21, 2006

(51) Int. Cl.
*G05B 13/02*    (2006.01)

(52) U.S. Cl.
USPC .............................. 700/31; 700/28; 700/30

(58) Field of Classification Search
USPC ................................. 700/28, 29, 30
See application file for complete search history.

(56) References Cited

U.S. PATENT DOCUMENTS

| | | | | |
|---|---|---|---|---|
| 6,112,126 | A * | 8/2000 | Hales et al. | 700/29 |
| 6,535,795 | B1 * | 3/2003 | Zetlmeisl et al. | 700/266 |
| 2005/0149209 | A1 * | 7/2005 | Wojsznis et al. | 700/30 |
| 2006/0090163 | A1 * | 4/2006 | Karisson et al. | 718/105 |

OTHER PUBLICATIONS

M Karisson, C. Karamanolis, X. Zhu, Triage: Performance Isolation and Differentiation for Storage Systems, In Proc. of the 12th Int'l Workshop on Quality of Service, Jun. 7, 2004.*

Yin Li, "Chameleon: a self-evolving, fully adatpive resource arbitrator for storage systems", usenix.org/.../full_papers/uttamchandani/uttamchandani_html/paper.html.*

"RepStore: A Self-Managing and Self-Tuning Storage Backend with Smart Bricks", Proceeedings of the International Conference on Automic Computing (ICAC '04), Zhang, Zheng et al.

"Performance virtualization for large-scale storage systems", Proceedings of the 22nd International Symposium on Reliable Distributed Systems (SRDS '03), Xu, Jian et al.

"Hierarchical Packet Fair Queing Algorithms", IEEE/ACM Transactions on Networking, vol. 5, No. 5, Oct. 1997, Bennett, Jon C. R. et al., pp. 675-689.

"WF2Q: Worst-case Fair Weighted Fair Queueing", IEEE 1996, Bennett, Jon C.R. et al., pp. 120-128.

"Latency_Rate Servers: A General Model for Analysis of Traffic Scheduling Algorithms", Stiliadis, Dimitrios et al., IEEE/ACM Transactions on Networking, vol. 6, No. 5 Oct. 1998, pp. 611-624.

"SoftUDC: A Software-Based Data Center for Utility Computing", Kallahalla, Mahesh et al., 2004 IEEE, pp. 38-46.

"How Fair is Fair Queuing", Greenberg, Albert G. et al., Journal of the Association for Computing Machiner, vol. 39, Jul. 1992, pp. 568-598.

(Continued)

*Primary Examiner* — Kavita Padmanabhan
*Assistant Examiner* — Darrin Dunn

(57) ABSTRACT

According to one embodiment, a method comprises receiving, by an adaptive controller, performance measurement for a computing system. The method further comprises estimating a performance model for use by the adaptive controller, and determining whether the estimated performance model has a correct sign for approaching performance desired for the computing system. When determined that the estimated performance model has an incorrect sign, the adaptive controller takes action to determine a performance model having a correct sign for approaching performance desired for the computing system.

7 Claims, 3 Drawing Sheets

(56) References Cited

OTHER PUBLICATIONS

Kamra, Abhinav et al., "Yaksha: A Self-Tuning Controller for Managing the Performance of 3-Tiered Web Sites," Proceedings of Twelfth IEEE International Workshop on Quality of Service, Jun. 2004, pp. 47-56, IEEE, Piscataway, NJ.

Karlson, Magnus et al., "Triage: Performance Isolation and Differentiation for Storage Systems," Proceedings of Twelfth IEEE International Workshop on Quality of Service, Jun. 2004, pp. 67-74, IEEE, Piscatawa, NJ.

Karlson, Magnus et al., "An Adaptive Optimal Controller for Non-Intrusive Performance Differentiation in Computing Services," Proceedings of IEEE Conference on Control and Automation, Jun. 2005, IEEE, Piscataway, NJ.

Lu, Ying, "An Adaptive Control Framework for QoS Quarantees and its Application to Differentiated Caching Services," Proceedings of International Workshop on Quality of Service, May 2002, IEEE, Piscataway, NJ.

Lumb, Christopher et al., "Facade: Virtual Storage Devices with Performance Guarantees," Proceedings of Second USENIX International Conference on File and Storage Technologies, Mar. 2003, pp. 131-144, USENIX Association, Berkeley, CA.

Parekh, Sujay, "Throttling Utilities in the IBM DB2 Universal Database Server," IBM Research Report, Proceedings of ACC 2004—American Control Conference, Jun. 2004, American Automatic Control Council, Dayton, OH.

Abdelzaher, Tarek F. et al., "Performance Guarantees for Web Server End-Systems: A Control-Theoretical Approach," Proceedings of IEEE Transactions on Parallel and Distributed Systems, Jan. 2002, vol. 13, No. 1, IEEE Press, Piscataway, NJ.

Robertsson, Anders et al., "Design and Evaluation of Load Control in Web Server Systems," Proceedings of 2004 American Control Conference, Jun. 2004, pp. 1980-1985, American Automatic Control Council, Dayton, OH.

Urgaonkar, Bhuvan et al., "Resource Overbooking and Application Profiling in Shared Hosting Platforms," ACM SIGOPS Operating Systems Review—OSDI '02: Proceedings of Fifth Symposium on Operating Systems Design and Implementation, 2002, pp. 239-254, vol. 36, No. SI (Winter 2002), Association for Computing Machinery, New York, NY.

Zhang, Zheng et al., "RepStore: A Self-Managing and Self-Tuning Storage Backend with Smart Bricks," Proceedings of International Conference on Automic Computing, May 2004, pp. 122-129, IEEE, Piscataway, NJ.

Chambliss, David A. et al., "Performance Virtualization for Large-Scale Storage Systems," Proceedings of Twenty-Second International Symposium on Reliable Distributed Systems, Oct. 2003, pp. 109-118, IEEE Computer Society, Washington, D.C.

Covell, Michele M. et al., "Articulated-Pose Estimation Using Brightness- and Depth-Constancy Constraints," Proceedings of IEEE Computer Vision and Pattern Recognition, Jun. 2000, pp. 2438-2445, vol. 2, IEEE, Piscataway, NJ.

Covell, Michele et al., "Calibration and Prediction of Streaming-Server Performances," ACM SIGMETRICS Performance Evaluation Review, Sep. 2005, pp. 33-35, vol. 33, No. 2, Association for Computing Machinery, New York, NY.

Bennett, Jon C. R. et al., "Hierarchical Packet Fair Queing Algorithms," IEEE/ACM Transactions on Networking, Oct. 1997, pp. 675-689, vol. 5, No. 5, IEEE, Piscataway, NJ.

Bennett, Jon C.R. et al., "WF2Q: Worst-Case Fair Weighted Fair Queueing," Proceedings of IEEE Infocom '96, Mar. 1996, pp. 120-128, IEEE, Piscataway, NJ.

Sundaram, Vijay et al., "A Practical Learning-Based Approach for Dynamic Storage Bandwidth Allocation," Proceedings of ACM/IEEE International Workshop on Quality of Service, Jun. 2003, pp. 479-497, IEEE, Piscataway, NJ.

Stiliadis, Dimitrios et al., "Latency-Rate Servers: A General Model for Analysis of Traffic Scheduling Algorithms," IEEE/ACM Transactions on Networking, Oct. 1998, pp. 611-624, vol. 6, No. 5, IEEE Press, Piscataway, NJ.

Shenoy, Prashant J., "Cello: A Disk Scheduling Framework for Next Generation Operating Systems," Real-Time Systems, Jan.-Mar. 2002, pp. 9-48, vol. 22, Nos. 1-2, Kluwer Academic Publishers, Norwell, MA.

Shen, Kai et al., "Integrated Resource Management for Cluster-Based Internet Services," ACM SIGOPS Operating Systems Review—OSDI '02 Proceedings of Fifth Symposium on Operating Systems and Design Implementation, 2002, pp. 225-238, vol. 36, No. SI (Winter 2002), Association for Computing Machinery, New York, NY.

Kallahalla, Mahesh et al., "SoftUDC: A Software Based Data Center for Utility Computing," Computer, Nov. 2004, pp. 38-46, vol. 37, No. 11, IEEE Computer Society Press, Los Alamitos, CA.

Abdelzaher, Tarek et al., "User-Level QoS-Adaptive Resource Management in Server End-Systems," IEEE Transactions on Computers, May 2003, pp. 1-18, vol. 52, No. 5, IEEE, Piscatawa, NJ.

Greenberg, Albert G. et al., "How Fair is Fair Queueing," Journal of the Association for Computing Machinery, Jul. 1992, pp. 568-598, vol. 39, No. 3, Association for Computing Machinery, New York, NY.

Goyal, Pawan et al., "Start-Time Fair Queing: A Scheduling Algorithm for Integrated Services Packet Switching Networks," IEEE/ACM Transactions on Networking, Oct. 1997, pp. 690-704, vol. 5, No. 5, IEEE Press, Piscataway, NJ.

Golestani, S. Jamaloddin, "A Self-Clocked Fair Queueing Scheme for Broadband Applications," Proceedings of IEEE INFOCOM '94, Jun. 1994, pp. 636-646, vol. 2, IEEE, Piscataway, NJ.

Davin, James R., "A Simulation Study of Fair Queueing and Policy Enforcement," ACM SIGCOMM Computer Communication Review, Oct. 1990, pp. 23-29, vol. 20, No. 5, Association for Computing Machinery, New York, NY.

* cited by examiner

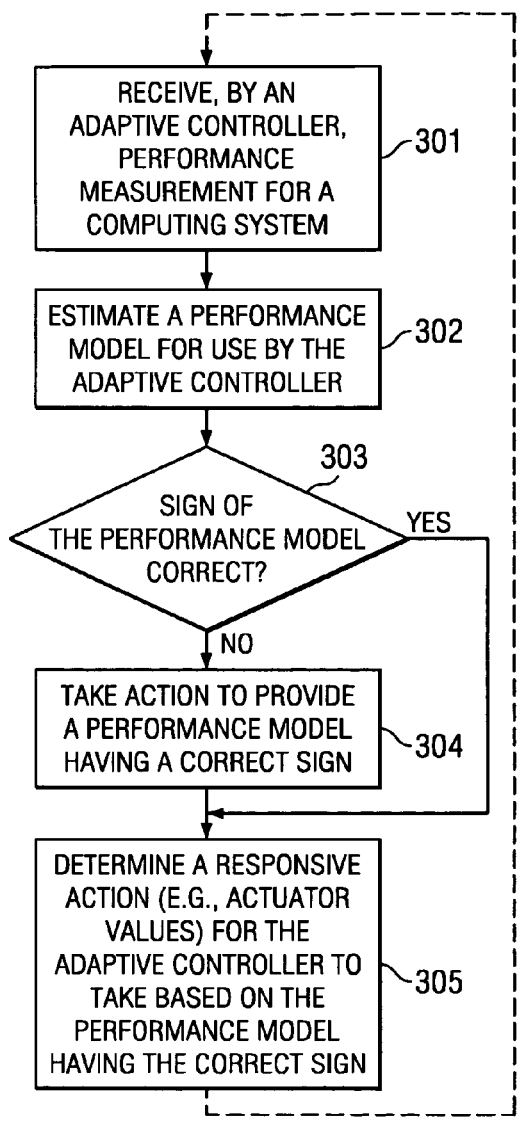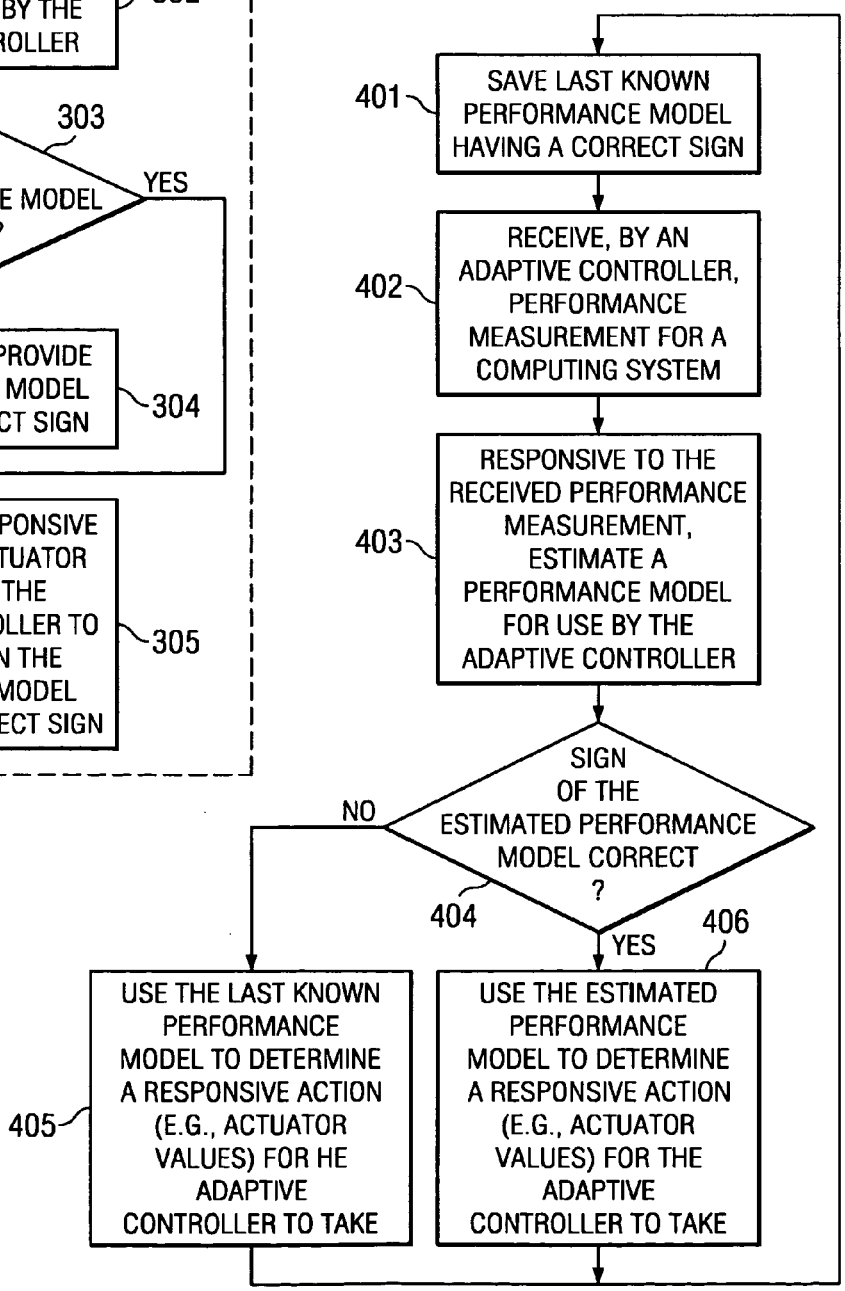

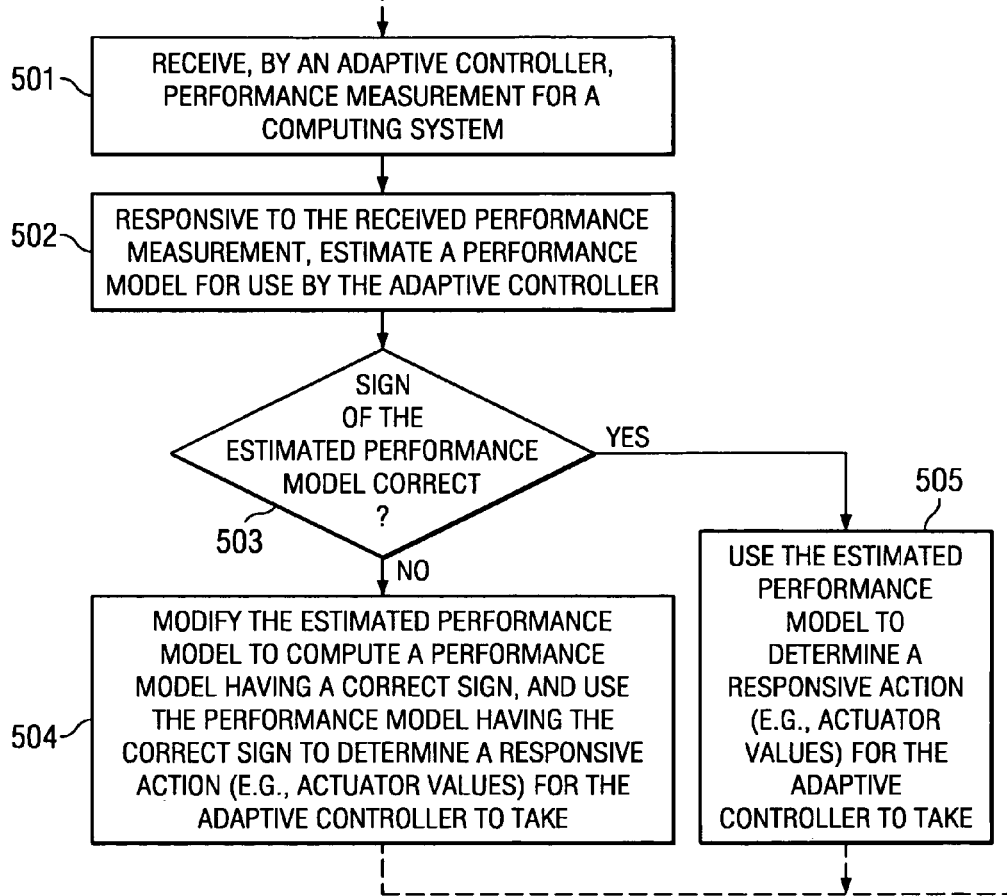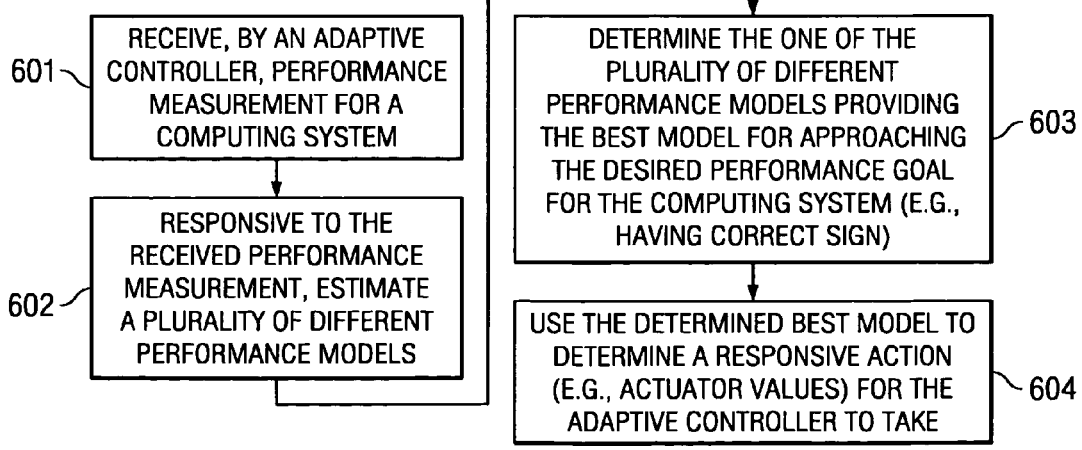

SYSTEM AND METHOD FOR DETERMINING CORRECT SIGN OF RESPONSE OF AN ADAPTIVE CONTROLLER

CROSS-REFERENCE TO RELATED APPLICATIONS

Not Applicable.

FIELD OF THE INVENTION

The following description relates in general to system management, and more particularly to a system and method for determining/maintaining a correct sign of response of an adaptive controller in managing performance of a system.

DESCRIPTION OF RELATED ART

The increasing costs associated with managing computer systems have spurred a lot of interest in automatically managing the systems with little or no human intervention. Examples of this include managing the energy consumption of servers, automatically maximizing the utility of data centers and meeting performance goals in file systems, 3-tier e-commerce sites, disk arrays, databases and web servers. Various techniques have been proposed for using a computerized management system for managing certain aspects of a computer system, such as for managing allocation of resources to different applications.

For a solution to a specific management problem to be applicable to as many systems as possible it should be non-intrusive. The reason for this is that most computing systems have no native support for automatic management, and in the general case, cannot be modified easily to do so due to proprietary sources and/or the complexity of the modifications. These typical type of computing systems, which have no native support for automatic management, are referred to herein as "black-box" systems. In general, such a black-box system can be represented as having a number of adjustable actuators (e.g., per workload CPU share or throughput per workload) that will change a number of measurements (e.g., latency, availability and throughput). Thus, a management solution of a black-box system would operate to discover a relationship between the actuators and the measurements, and then be able to set the actuators so the management goals are achieved.

One technique that has been proposed for solving management problems of black-box systems are management techniques utilizing what is commonly known in the art as "control-theoretic feedback loops." These methods can deal with poor knowledge of the system, changes in the system or the workloads, and other disturbances. However, classical non-adaptive control-theoretic methods are usually not adequate for at least two reasons. First, for many systems it is not even possible to use non-adaptive control because the system changes too much. For example, the performance experienced by a client of a three-tier e-commerce site depends on many things, such as: what tier a request is served from, if it was served from the disk or the memory cache of that tier, what other clients are in the system, and so on. Second, to be applicable to more than one specific system configuration, it is unreasonable to require a lot of tuning for each system change.

In view of the above, adaptive controllers that automatically tune themselves while the system is running may be desirable for use in managing the system. Self-tuning regulators (STR) are one of the most commonly used and well-studied adaptive controllers. STRs have two parts: an estimator and a control law, which are usually invoked at every sample period. The most commonly used estimator in STRs is recursive least-squares (RLS). The purpose of this estimator is to dynamically estimate a model of the system relating the measured metrics with the actuation. The control law will then, based on this model, set the actuators in attempt to achieve the desired performance. The ability of the controller to achieve the performance goals is explicitly tied to how well the model represents the system at that instant.

As described further herein, adaptive controllers using an RLS-based estimator have traditionally been inaccurate in certain instances of modeling the system, particularly when being used to tune the actuators for a portion of the system that may have its performance impacted by an external event (i.e., an event that is not taken into account by the model). As a brief example, suppose a system comprises multiple applications that share resources such as CPU, memory, network, etc. Thus, for a given ("first") application, an adaptive controller using an RLS-based estimator may be used for adaptively managing the amount of capacity of the shared resources to be allocated to the application. Suppose now that a second application is started in the system that has a large impact on the amount of the shared resources consumed by such second application. As a result of the second application's utilization of the shared resources, the first application may have its performance decline due to decreased capacity of the shared resources being available to such first application. The RLS-based estimator may detect the decline in performance of the first application, and may thus adjust the control law to set the actuators in attempt to allocate more capacity to the first application. The impact on the performance of the first application, in this instance, is not due to the workload being presented to the first application, but is instead at least partially due to the second application's consumption of resources (which is an "external event" that is not taken into account by the RLS-based estimator in evaluating the performance of the first application. If, in response to the above-mentioned adjustment to the control law (which in turn adjusts the actuators), the adaptive controller detects that the performance of the first application continues to decline (which, unappreciated by the adaptive controller, is due to further impact on resource consumption by the second application), the estimator determines that its model must be incorrect and gradually changes its sign of the model. When the sign of the model changes, the controller takes an incorrect action by changing its adjustment as to allocate less capacity to the first application in attempt to improve its performance. Of course, this allocation of less capacity is exactly the opposite action that should be taken for attempting to improve the first application's performance.

Thus, in some instances the "sign" of the responsive action (or the sign of the model) determined by traditional RLS-based estimators is opposite what it should be for an appropriate response. That is, whether the response is to have a "positive sign" (e.g., increase in capacity allocated to the application in the above scenario) or a "negative sign" (e.g., decrease in capacity allocated to the application in the above scenario) is incorrectly determined in some instances when using a traditional RLS-based estimator in an adaptive controller, which negatively impacts the ability of the controller to successfully manage the system.

BRIEF DESCRIPTION OF THE DRAWINGS

FIG. 3 shows an exemplary operational flow diagram of an embodiment of the present invention;

FIG. 4 shows an operational flow diagram of an embodiment referred to herein as the Remember method;

FIG. 5 shows an operational flow diagram of an embodiment referred to herein as the Modify method; and FIG. 6 shows an operational flow diagram of an embodiment referred to herein as the RunAll method.

DETAILED DESCRIPTION

Embodiments of the present invention provide a system and method for determining a correct sign of response of an adaptive controller. For instance, in certain embodiments, an adaptive controller determines a performance model for managing a black-box computing system, and embodiments of the present invention ensure that the sign of the response determined by such performance model is appropriate for approaching a desired performance. More specifically, certain embodiments maintains a correct sign for a performance model that is estimated based on monitored performance, even if performance is impacted by external events not accounted for in the model. Because the model's sign is correct, this aids in maintaining the sign of the responsive action taken based on such model correct. Therefore, the ability for an adaptive controller to autonomously manage a system is improved.

According to certain embodiments, we propose certain extensions to RLS that provide good control performance for STRs. More specifically, we propose three exemplary methods of dealing with poor models such that they do not decrease controller performance. These three methods are: (1) to remember a good model and use that one when a poor model is produced, (2) to modify the poor model such that it becomes good, and (3) to run multiple estimators and pick the best model out of all of them.

Figure 1:
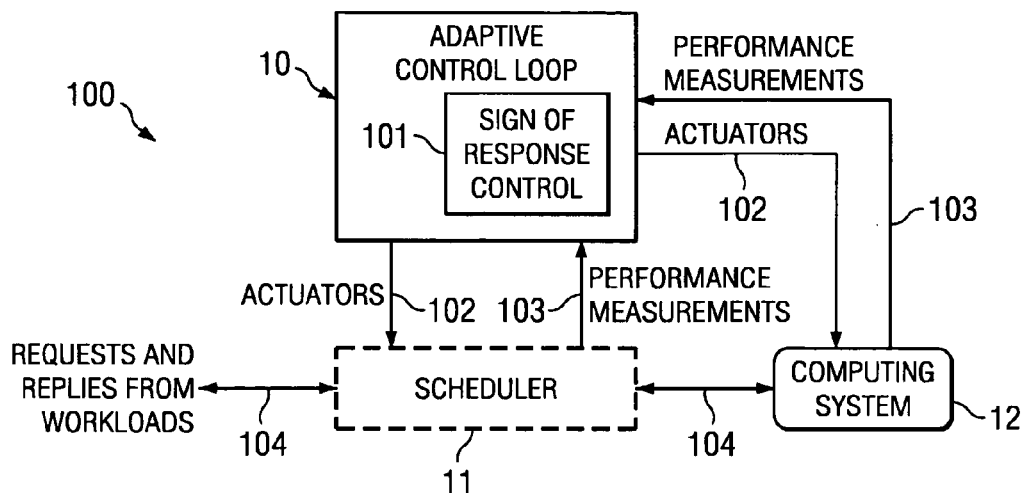
FIG. 1 shows an exemplary representation of a system for which embodiments of the present invention may be implemented.

FIG. 1 shows an exemplary representation of a system 100 for which embodiments of the present invention may be implemented. System 100 includes a black-box computing system 12 that is managed via an adaptive control loop 10. Computing system 12 may comprise any type of processor-based system (e.g., a server, PC, laptop, data center, etc.), and may have, for example, multiple applications that share resources such as CPU, memory, network, etc. Computing system 12 services workloads 104.

The computing system 12 has a number of control parameters that affect the system. These controls are called actuators. Examples of such actuators 102 that may be controlled by adaptive control loop 10 include CPU utilization (e.g., percentage), network bandwidth allocation, number of I/O requests per second, etc. Adaptive control loop 10 (which may be referred to as an "adaptive controller" and may form part or all of a management system) measures the effect that actuators 102 have on the system 12 using the measurements 103 that the system 12 exports. The performance measurements 103 that may be measured for a computing system 12 may include, as example, request latency, throughput, bandwidth, temperature, power consumption, and/or other types of performance measurements. As described further herein, the adaptive control loop 10 may, based on the performance measurements 103, adjust the actuators 102 in attempt to maintain performance desires defined for system 12.

As an example, computing system 12 may be a web server having a performance goal (e.g., SLA) of no more than a threshold latency for servicing requests received from clients. Thus, the performance measurements may, in this case, be request latency, and the actuators 102 may be CPU share allocated to the web server for servicing the received requests.

If the computing system 12 does not export suitable actuators 102 or measurements 103, the flow of requests for workload 104 may be via a scheduler 11 (shown in dashed lines in FIG. 1 as optional). In such case, the adaptive control loop 10 may control (actuate) the flow into the system 12 and measure the performance at the scheduler 11. A given system 100 might have actuators and measurements from either the scheduler 11 or the black-box computing system 12, or from both of the two parts.

Embodiments of the present invention are directed to exemplary algorithms that may be employed for adaptive control loop 10. For instance, exemplary embodiments are described further herein for providing logic 101 for ensuring that the sign of the actuation made by the adaptive control loop 10 is proper even when the performance measurements are impacted by events external to the model of the system 12 under control. Thus, logic 101 is referred to in FIG. 1 as "sign of response control" logic 101 because such logic employs a technique, such as those described further herein, for controlling the sign of the responsive action taken by the adaptive controller 10 (e.g., logic 101 controls whether to increase or decrease an actuator 102). In the embodiments described herein, the sign of the performance model is controlled by logic 101, which aids in controlling the sign of the responsive action taken based on such performance model. That is, as described further herein, techniques are provided that manipulate the performance model (i.e., the "sign" of the performance model). By manipulating the model, the control law can, in most cases, be steered in the right direction. Thus, the exemplary techniques described herein attempt to control the sign of the response by controlling the sign of the underlying performance model.

Exemplary techniques for implementing logic 101 are described further herein, including the below-described "Remember," "Modify," and "RunAll" techniques. Such exemplary techniques for implementing logic 101 are applicable to any combination of actuators and measurements, as long as the expected relationship between them is monotonic. As an example of a monotonic relationship, assume $y=f(x)$, the function $f()$ is monotonic if y always increases (or always decreases) when x is increased. In other words, the function $f()$ is monotonic if the sign of y remains constant as x is increased. The function $f=x^2$ is monotonic for $x \geq 0$ or $x \leq 0$ but is not monotonic over both positive and negative x values. In this example, between $x=0$ and $x=-1$ the value of y decreases, while the value of y increases when the value of x is between 0 and 1. Exemplary adaptive control systems in which embodiments of the present invention may be employed include, but are not limited to: controlling the percentage of CPU resources assigned to each of a plurality of different workloads and measuring performance in terms of transferred bits/sec; changing the amount redundancy and measuring the dependability; and adjusting CPU frequency to meet power consumption targets.

Figure 2:
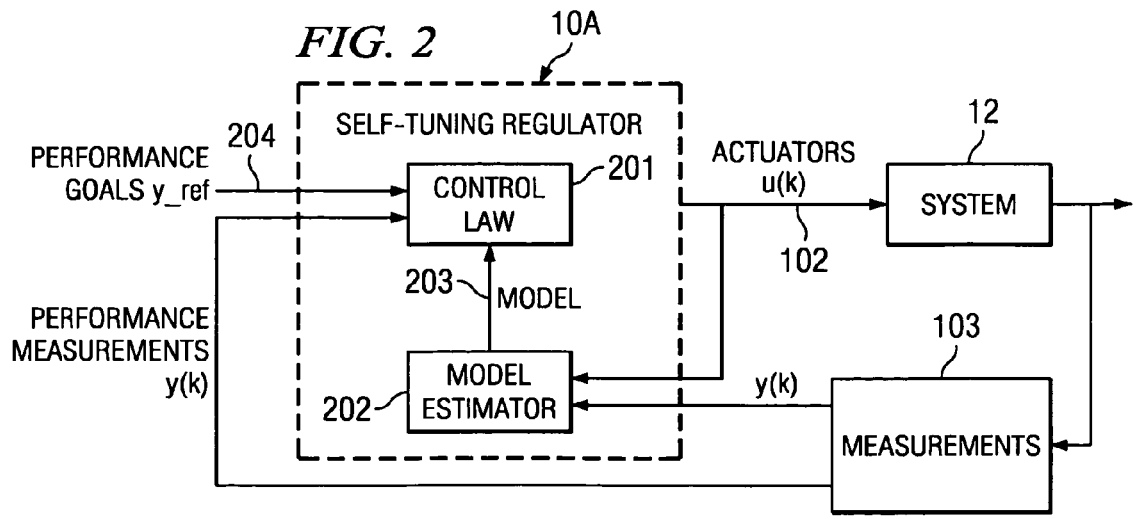
FIG. 2 shows an exemplary self-tuning regulator (STR) in which embodiments of the present invention may be implemented.

In certain embodiments, the adaptive controller 10 is implemented as a self-tuning regulator (STR), such as described further in connection with FIG. 2. In FIG. 2, STR 10A comprises two parts: an estimator 202 and a control law 201. STRs are one of the most commonly used and well-studied types of adaptive controllers. Typically, estimator 202 and control law 201 are invoked at every sample period. Estimator 202 dynamically estimates a model 203 of the system 12 relating the measured metrics 103 with the actuation 102. Control law 201 will then, based on this model 203, set the actuators in attempt to achieve the desired performance 204. The ability of the STR 10A to achieve the performance goals 204 is explicitly tied to how well the model 203 represents the system 12 at that instant.

The most commonly used estimator 202 in STRs is recursive least-squares (RLS). Traditional estimator and control law implementations are now described briefly to explain why traditional STRs do not perform well for managing systems in certain instances.

Recursive least-squares (RLS) is one of the most widely used estimation algorithms in adaptive controllers, due to its robustness against noise, its good convergence speed and proved convergence properties that can be used to prove the stability of the whole control loop. Embodiments of the present invention may be used with RLS. That is, the embodiments described further below for controlling the sign of response taken by the adaptive controller may be used with RLS for ensuring that the sign of the performance model determined by RLS is correct for approaching the desired performance. Of course, embodiments of the present invention are not limited in application to RLS, but may be used in various other model estimation algorithms, including without limitation other versions of least-squares, such as extended least-squares, total least-squares, the projection algorithm, the stochastic approximation algorithm and least-mean squares. Embodiments of the present invention may also be used with other control algorithms, such as model reference adaptive controllers. Embodiments of the present invention may be used for any technique estimating a model on the same form as RLS.

To aid in explaining least-squares estimation, we first introduce some notation. Let $u(k)=[u_1(k) \ldots u_M(k)]^T$ be the vector of the M actuator setting during sampling interval k, and let $y(k)=[y_1(k) \ldots y_N(k)]^T$ be the vector of the performance measurements of the N workloads, measured at the beginning of interval k. Various notations used herein are provided in Table 1 below for easy reference.

TABLE 1

| Symbol | Meaning |
| --- | --- |
| Y(k) | Performance measurements at time k. |
| U(k) | Actuator settings at time k. |
| Ai | Model parameters in front of y. |
| Bi | Model parameters in front of u. |
| X(k) | Model parameter matrix at time k. |
| Φ(k) | Regression vector at time k. |
| Yref(k) | Desired performance at time k. |
| T(k) | Throughput at time k. |
| $Y_{ref}$(K) | Total throughput at time k. |
| L(k) | Latency at time k. |
| S(k) | Share setting at time k. |

The relationship between u(k) and y(k) can be described by the following multiple-input-multiple-output (MIMO) model:

$$y(k) = \sum_{i=0}^{n} A_i y(k-i-1) + B_i u(k-i-1) \quad (1)$$

where $A_i$ and $B_i$ are the model parameters. Note that $A_i \in \Re^{N \times N}$, $B_j \in \Re^{N \times M}$, $0 \leq i \leq n$, $0 \leq j < n$ where n is the order of the model. This linear model was chosen for tractability as we know that the relationship will indeed, in all but the most trivial cases, be nonlinear. However, it will be a good local approximation of the nonlinear function, and this will often be good enough for the controller as it usually only makes small changes to the actuator settings.

For notational convenience, we rewrite the system model in the following form, which is used hereafter:

$$y(k+1) = X(k)\phi(k) \quad (2)$$

where
$X(k) = [B_0 \ldots B_{n-1} A_0 \ldots A_{n-1}]$
$\phi(k) = [u^T(k) \ldots u^T(k-n+1) y^T(k) \ldots y^T(k-n+1)]^T$ where X(k) is called the parameter matrix and φ(k) is referred to as the regression vector. RLS is then defined by the following equations:

$$\hat{X}(k+1) = \hat{X}(k) + \frac{\varepsilon(k+1)\phi^T(k)P(k-1)}{\lambda + \phi^T(k)P(k-1)\phi(k)} \quad (3)$$

$$\varepsilon(k+1) = y(k+1) - \hat{X}(k)\phi(k) \quad (4)$$

$$P(k) = \frac{P(k-1)}{\lambda} - \frac{P(k-1)\phi(k)\phi^T(k)P(k-1)}{\lambda(1+\phi^T(k)P(k-1)\phi(k))} \quad (5)$$

where $\hat{X}(k)$ is the estimate of the true value of X(k), $\varepsilon(k) \in \Re^{N \times 1}$ is the estimation error vector, $P(k) \in \Re^{NMn \times NMn}$ is the covariance matrix and λ is the forgetting factor (0<λ≤1). A high λ means that RLS remembers a lot of old data when it computes the new model. Conversely, a low λ means that it largely ignores previous models and only focuses on producing a model from the last few samples.

The intuition behind these equations is quite simple. Equation (4) computes the error between the latest performance measurements and the performance prediction of the model $\hat{X}(k)\phi(k)$. We refer to this as the rls error. The model parameters are then adjusted in equation (3) according to the rls error and another factor dependent on the covariance matrix P computed in equation (5). P contains the covariances between all the measurements and the actuators. The model $\hat{X}$ is then used by the control law 201 (described further below) to set the actuators 102 correctly.

The only way RLS defines an error in the model 203 is through the rls error. As illustrated further hereafter, even if a model 203 has no rls error, it still might give rise to unacceptable controller performance. To be able to explain why this is the case and what other property other than rls error the model 203 needs to have, we first briefly explain a basic self-tuning regulator (STR). While this basic STR has a number of drawbacks, it serves the purpose of explaining the problem with as little as possible of control-theoretic details. All other direct STRs have the problem discussed hereafter, the equations are just more elaborate.

Assume for notational convenience that the order of our system model 203 is one. The model (1) is then:

$$y(k) = A_0 y(k-1) + B_0 u(k-1) \quad (6)$$

To turn this model 203 into a control law 201, we observe that control law 201 is a function that returns u(k) 102. If we shift equation (6) one step ahead in time and solve for u(k), we get:

$$u(k) = B_0^{-1}(y(k+1) + A_0 y(k)) \quad (7)$$

If this equation (7) is to be used to calculate the actuation setting u(k) 102, then y(k+1) represents the desired performance to be measured at the next sample point at time k+1, i.e., it is $Y_{ref}(k)$. Thus, the final control law 201 is:

$$u(k) = B_0^{-1}(y_{ref}(k) + A_0 y(k)) \quad (8)$$

This is a simple STR 10A for the model 203 given by equation (6).

To illustrate the point that a model 203 with zero rls error can still cause the controller to underperform, consider a black-box computing system 12 where the actuator 102 is the share of CPU allocated to each workload, and the performance metric 103 being monitored is latency. For this system 12, consider two estimators 202 that produce these two models 203 with only one input and one output:

$$X_1(k) = [-0.2 \ 0.6]$$

$$X_2(k) = [0.2 \ 0.4]$$

If $y(k-1)=y(k)=4$ and $u(k-1)=2$ i.e., $\phi(k-1)=[2 \ 4]^T$, then $X_1(k)\phi(k-1)=X_2(k)\phi(k-1)$ and both have the same rls error. Consider now what happens when we use these two models that are equivalent in the least-squares sense, in the control law of equation (8) when $y_{ref}(k)=1$. For the first model, the actuator setting would be $$u_1(k) = \frac{1}{-0.2}(1 - 0.6 \cdot 4) = 7.$$

This first model does what we would expect. When the controller observes a latency that is higher than desired it should increase the CPU share of the workload so that its latency will go down. But with the second model, the controller does the complete opposite of what is desired, as $$u_2(k) = \frac{1}{0.2}(1 - 0.4 \cdot 4) = -3.$$

That is, the controller decreases the CPU share so that the latency is increased and the latency target is missed even more. If the model was constant, the controller using the second model would eventually reach the latency goal. But, with an adaptive controller, the model changes over time, and so this bad behavior might go on for a much longer time.

In the example above, $B_0$, which may be referred to as the "sign of the response" or the "sign of the model," is negative when the controller works and positive when it does not work. That is, in this example, the controller is taking the opposite action than it should take when the sign of the response is positive. The physical meaning of $B_0$ in equation (6) should reflect the fact that if more CPU share is given to a workload, the latency should go down, and conversely, if less CPU share is given to a workload the latency should go up. For that to be true, $B_0$ has to negative in this example.

To illustrate why it is more important for $B_0$ to have the correct sign than any other model parameter, consider the following exemplary control law 201 derived using a second order model 203.

$$u(k) = B_0^{-1}(y_{ref}(k) - A_0 y(k) - A_1 y(k-1) - B_1 u(k1-1)) \quad (9)$$

If one of $A_0$, $A_1$ or $B_1$ has the incorrect sign, the other parameters might correct for this and the whole expression within the parenthesis comes out with the correct sign. However, if $B_0$ has the wrong sign there is no single parameter that can compensate for this, unless the whole expression within the parenthesis comes out with the wrong sign too. The higher the order, the more critical it is that $B_0$ has the correct sign, compared to the all the other model parameters.

When the model 203 has more than one input and one output, $B_0$ is a matrix. The diagonals of this matrix should then be negative as an increase in CPU share of a workload should result in lower latency. Each entry in the anti-diagonal captures the effect that increasing the share of one workload has on the latency of one other workload. These should then be positive or zero. That is, each entry in the anti-diagonal is positive if the two workloads compete for some resource in the system as increasing the share of one would decrease it for the other, and zero if they do not compete for a resource. (It is actually possible for the anti-diagonal entries to be negative as increasing the amount of resources for one workload might positively help another. This might occur, for example, if one workload loads data into a cache that the other workload then reads.) A correct Bo for the combination of a CPU share actuator 102 and latency as the performance measurement 103, would be as follows:

$$\begin{pmatrix} <0 & \geq 0 & \cdots & \geq 0 \\ \geq 0 & <0 & \cdots & \geq 0 \\ \vdots & \vdots & \ddots & \vdots \\ \geq 0 & \geq 0 & \cdots & <0 \end{pmatrix} \quad (10)$$

Other actuator and performance measurement combinations would have other rules on what a correct Bo should be. For example, if the performance measurement 103 were throughput instead of latency, the diagonals of matrix (10) would be >0, as higher CPU share means higher throughput. The anti-diagonals would then be ≤0.

FIG. 3 shows an operational flow diagram according to an embodiment of the present invention. In operational block 301, an adaptive controller (e.g., controller 10 or 10A of FIGS. 1 and 2, respectively) receives performance measurement for a computing system (e.g., system 12 of FIGS. 1-2). In block 302, a performance model 203 is estimated by the adaptive controller (e.g., by model estimator 202 of FIG. 2). In block 303, the adaptive controller determines whether the sign of the estimated performance model is correct for the performance goal desired to be achieved for the computing system. If the sign is correct, operation advances to block 305 described below. If the sign of the estimated performance model is not correct, operation advances from block 303 to block 304 where the adaptive controller takes action to provide a performance model having a correct sign. Various exemplary techniques (e.g., those identified in Table 2 below) are described further below for taking action to provide a performance model having a correct sign when the sign of an estimated model is incorrect. In operational block 305, the adaptive controller determines (e.g., via control law 201) a responsive action (e.g., actuator values 102) to take based on the performance model having the correct sign. In this regard, because the underlying performance model has the correct sign, the responsive action determined to be taken should have the correct sign for approaching the performance goals desired for the computing system. Thus, even though the performance measurements received by the adaptive controller may be effected by external events (that are not accounted for in the performance model), embodiments of the present invention enable the adaptive controller to maintain a performance model having a correct sign.

Embodiments of the present invention propose a number of techniques that can alleviate the impact of a $B_0$ with an incorrect sign. Three exemplary methods are described below, which may be used to alleviate or completely remove the effects of $B_0$ errors. The exemplary methods are summarized below in Table 2.

TABLE 2

| Short-hand | Brief Description |
|---|---|
| Remember | Remember a good model from the past and use that one if $B_0$ is bad. |
| Modify | Modify the model so that $B_0$ becomes good. |
| RunAll | Estimate models from all estimators all the time and use the model that is the best. |

A first exemplary embodiment employs a technique referred to herein as the "Remember" method. An operational flow diagram of the Remember method is shown in FIG. 4. The Remember method saves the latest known good model that had a correctly signed $B_0$ (operational block 401). In operational block 402, an adaptive controller (e.g., controller 10 or 10A of FIGS. 1 and 2, respectively) receives performance measurement for a computing system (e.g., system 12 of FIGS. 1-2). In block 403, a performance model is estimated by the adaptive controller (e.g., by model estimator 202 of FIG. 2) based on such received performance measurement. In block 404, the adaptive controller determines whether the sign of the estimated performance model is correct for the performance goal desired to be achieved for the computing system. When the new model is estimated with a $B_0$ sign error, the Remember method uses the last known good model instead of the new model (operational block 405). The Remember method can determine that the new model has a $B_0$ sign error by checking the $B_0$ of the new model against equation (10) (or another pre-defined equation for the system being modeled). If one or more of the inequalities are not true, then it has a $B_0$ sign error. This Remember method continues using the last known good model until the new model recovers and computes a correctly signed $B_0$. When the estimated performance model has a correct sign, such estimated model is used for determining the adaptive controller's responsive action (operational block 406), and such newly estimated performance model is saved in block 401 as the last known performance model having a correct sign. While simple, a drawback of this Remember method is that the model might never recover (or may take an undesirably long time to recover), and in that case the outdated model that might not at all represent the system anymore continues to be used for an undesirably long period of time.

A second exemplary embodiment employs a technique referred to herein as the "Modify" method. An operational flow diagram of the Modify method is shown in FIG. 5. The Modify method addresses this problem by forcefully modifying the performance model when a $B_0$ error is detected. In operational block 501, an adaptive controller (e.g., controller 10 or 10A of FIGS. 1 and 2, respectively) receives performance measurement for a computing system (e.g., system 12 of FIGS. 1-2). In block 502, a performance model is estimated by the adaptive controller (e.g., by model estimator 202 of FIG. 2) based on such received performance measurement. In block 503, the adaptive controller determines whether the sign of the estimated performance model is correct for the performance goal desired to be achieved for the computing system. Again, it may be determined that the new model has a $B_0$ sign error by checking the $B_0$ of the new model against equation (10) (or another pre-defined equation for the system being modeled).

When the estimated performance model has a correct sign, such estimated model is used for determining the adaptive controller's responsive action (operational block 505). When the new model is estimated with a $B_0$ sign error, the Modify method modifies the estimated performance model (e.g., using the technique described further below) to compute a performance model having a correct sign, and uses the performance model having the correct sign for determining a responsive action (operational block 504).

As an example of the Modify method, let $B_0$ be a matrix with a $B_0$ error and let $B_0+\tilde{B}$ be a matrix that does not have a $B_0$ error. $\tilde{B}$ is chosen so that an entry with the wrong sign gets the value 0.001 if it should be positive and −0.001 if it should be negative. In this illustrative example, the value 0 was not chosen for use in representing a $B_0$ that should be positive or negative, as it might give rise to divisions by zero and singular matrices. If we were to modify $B_0$ alone in this way (i.e., by adding the 0.001 or −0.001 to $B_0$), the model would suddenly predict completely different u(k) values than before and have an rls error. This might actually make the controller perform much worse than before. Therefore, in this exemplary embodiment, the whole model is modified, in the manner described further below, such that it predicts the same model locally with the modified $B_0+\tilde{B}$ matrix as it did before with only $B_0$.

Let K be the predicted output of the unmodified model without the terms $B_i$ and $A_i$ for i>0, that can safely be ignored for our purpose. Then the unmodified model is:

$$k = A_{0y}(k) + B_0 u(k) \tag{12}$$

Then the problem can be specified as:

$$K = (A_0 + \tilde{A})y(k) + (B_0 + \tilde{B})u(k) \tag{13}$$
$$= A_{y0}(k) + \tilde{A}y(k) + B_0 u(k) + \tilde{B}u(k)$$

Using equation (12), this is equivalent to $$\tilde{A}_y(k) + \tilde{B}u(k) = 0 \Leftrightarrow \tilde{A}_y = -\tilde{B}u(k) \tag{14}$$

This equation (14) has multiple solutions as $-\tilde{B}_u(k)$ is a row vector and $\tilde{A}$ is a matrix. One possible solution is to set $\tilde{A}$ to the following:

$$\tilde{A} = \begin{pmatrix} -V_1/y_1(k) & 0 & \cdots & 0 \\ 0 & -V_2/y_2(k) & \cdots & 0 \\ \vdots & \vdots & \ddots & \vdots \\ 0 & 0 & \cdots & -V_N/y_N(k) \end{pmatrix} \tag{15}$$

where $V_i$ is row i of $\tilde{B}u(k)$ and $y_i(k)$ is row i of y(k). Note that this modified model will only be the same as the unmodified one locally around φ(k).

A third exemplary embodiment employs a technique referred to herein as the "RunAll" method. The RunAll method runs a plurality of estimators (e.g., six estimators) in parallel. An operational flow diagram of the RunAll method is shown in FIG. 6. In operational block 601, an adaptive controller (e.g., controller 10 or 10A of FIGS. 1 and 2, respectively) receives performance measurement for a computing system (e.g., system 12 of FIGS. 1-2). In block 602, a plurality of different performance models are estimated by the adaptive controller (e.g., by model estimator 202 of FIG. 2) based on such received performance measurement.

One may think of a plurality of different actuator and measurement combinations, such as weight to latency and throughput to latency, as examples. As an example, one may estimate one model between all shares and latency, another model between throughput and latency, and a third model between throughput plus the total throughput and latency. Of course, these are only examples, and any number of models in addition to or instead of these examples may be used.

According to one embodiment, the RunAll method runs one estimator for each of a plurality of different models. In operational block 603, the adaptive controller determines the one of the plurality of different performance models providing the best model for approaching the desired performance goal for the computing system. For instance, out of the plurality of different models being used, the RunAll method may select the model that has no $B_0$ sign errors and that has the lowest rls error. A number of criteria can be used by the RunAll method to select the "best" estimator. As one example, the estimator with the least amount of $B_0$ error according to equation (17) above, or the estimator with the lowest value of the sum of equation (16)+equation (17) may be used. If there is no model with a correctly signed $B_0$, the RunAll method may select the one with the least amount of $B_0$ error. The intuition behind this is that hopefully at least one of the estimators will always produce a good model that we can use, and we believe that a good $B_0$ is more important than a perfect rls error. Many other ways to select the model to use exists, e.g., forming a weighted sum of the two errors and pick the one with the lowest. The determined best models is used, in operational block 604, for determining a responsive action (e.g., actuator values) for the adaptive controller to take.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. Thus, the exemplary operations described above (e.g., the flows of FIGS. 3-6) may be implemented in a system via computer-executable software code. The software code may run on any suitable processor-based system, such as the exemplary systems of FIGS. 1-2.

What is claimed is:

1. A method comprising:
   receiving, by an adaptive controller, performance measurement for a computing system;
   estimating, based at least in part on said received performance measurement, a plurality of different performance models;
   identifying at least one of said estimated performance models having a correct sign for approaching performance desired for said computing system;
   using one of said at least one identified performance models for determining a responsive action for said adaptive controller to take in response to said received performance measurement; and
   maintaining, by said adaptive controller, a correct sign for an estimated performance model that is used for determining said responsive action, even when an external event that is not accounted for in the estimated performance model impacts said performance measurement received for said computing system.

2. A system comprising:
   a computing system; and
   an adaptive controller operable to monitor performance of said computing system and take responsive action to manage performance of said computing system, wherein said adaptive controller comprises
   a) a model estimator for estimating a plurality of performance models based at least in part on said monitored performance;
   b) a control law for setting an actuator, based on an estimated performance model, in attempt to achieve desired performance for said computing system; and
   c) logic for controlling a sign of said estimated performance model used by said control law for setting said actuator, wherein said logic for controlling maintains a correct sign for said estimated performance model for approaching performance desired for said computing system even when said monitored performance is impacted by an external event that is not accounted for in said estimated performance model, wherein said logic for controlling comprises logic for selecting a best model from said plurality of different performance models.

3. The system of claim 2 wherein said computing system is a black-box computing system.

4. The system of claim 2 wherein said adaptive controller comprises a self-tuning regulator.

5. The system of claim 2 wherein said logic for selecting a best model from said plurality of different performance models comprises:
   logic for selecting one of said plurality of different performance models having a correct sign for approaching performance desired for said computing system.

6. An adaptive controller comprising:
   a model estimator for estimating a plurality of performance models based at least in part on a performance measurement received for a computing system;
   a control law for setting an actuator of said computing system, based on an estimated performance model, for managing performance of said computing system; and
   logic for controlling a sign of said estimated performance model used by said control law for setting said actuator to maintain said sign correct for approaching performance desired for said computing system even when said performance measurement is impacted by an external event that is not accounted for in said estimated performance model, wherein said logic for controlling a sign of said estimated performance model comprises logic for selecting a best model from said plurality of different performance models.

7. The adaptive controller of claim 6 wherein said logic for selecting a best model from said plurality of different performance models comprises:
   logic for selecting one of said plurality of different performance models having a correct sign for approaching performance desired for said computing system.

* * * * *